(12) United States Patent
Rosskamp

(10) Patent No.: US 7,021,110 B2
(45) Date of Patent: Apr. 4, 2006

(54) APPARATUS FOR PREPARING U-SHAPED SPACERS FOR INSULATING UNITS

(75) Inventor: Barent A. Rosskamp, Butler, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 308 days.

(21) Appl. No.: 10/444,746

(22) Filed: May 23, 2003

(65) Prior Publication Data

US 2004/0231277 A1    Nov. 25, 2004

(51) Int. Cl.
  *B21D 28/02*   (2006.01)
  *B21D 53/74*   (2006.01)

(52) U.S. Cl. .................. 72/326; 72/307; 72/294; 29/897.312; 29/566.1; 52/786.13

(58) Field of Classification Search .............. 72/307, 72/335, 326, 325, 294, 379.2; 29/897, 897.312, 29/566.1; 52/786.13
See application file for complete search history.

(56) References Cited

U.S. PATENT DOCUMENTS

| | | | | |
|---|---|---|---|---|
| 1,615,823 A | * | 2/1927 | Barclay | 49/394 |
| 3,296,991 A | * | 1/1967 | Rawson | 72/335 |
| 5,177,916 A | | 1/1993 | Misera et al. | 52/172 |
| 5,231,862 A | * | 8/1993 | Ashley | 72/332 |
| 5,255,481 A | | 10/1993 | Misera et al. | 52/172 |
| 5,313,761 A | * | 5/1994 | Leopold | 52/786.1 |
| 5,351,451 A | | 10/1994 | Misera et al. | 52/172 |
| 5,501,013 A | | 3/1996 | Misera et al. | 29/897.312 |
| 5,617,699 A | * | 4/1997 | Thompson, Jr. | 52/786.13 |
| 5,655,282 A | | 8/1997 | Hodek et al. | 29/469.5 |
| 5,675,944 A | | 10/1997 | Kerr et al. | 52/172 |
| 5,761,946 A | | 6/1998 | Misera et al. | 72/181 |
| 6,115,989 A | * | 9/2000 | Boone et al. | 52/786.13 |
| 6,138,359 A | * | 10/2000 | Mears | 29/897.312 |
| 6,223,414 B1 | | 5/2001 | Hodek et al. | 29/527.1 |
| 6,470,561 B1 | | 10/2002 | Misera et al. | 29/527.1 |

* cited by examiner

*Primary Examiner*—Daniel C. Crane
(74) *Attorney, Agent, or Firm*—Andrew C. Siminerio

(57) ABSTRACT

A device is disclosed for preparing a U-shaped spacer having a longitudinal axis, wherein the spacer has first and second opposing sides extending from a spacer bottom, and wherein the spacer is to be used as a spacer between glass sheets on insulating frames. A method for producing such spacer features is also disclosed.

11 Claims, 5 Drawing Sheets

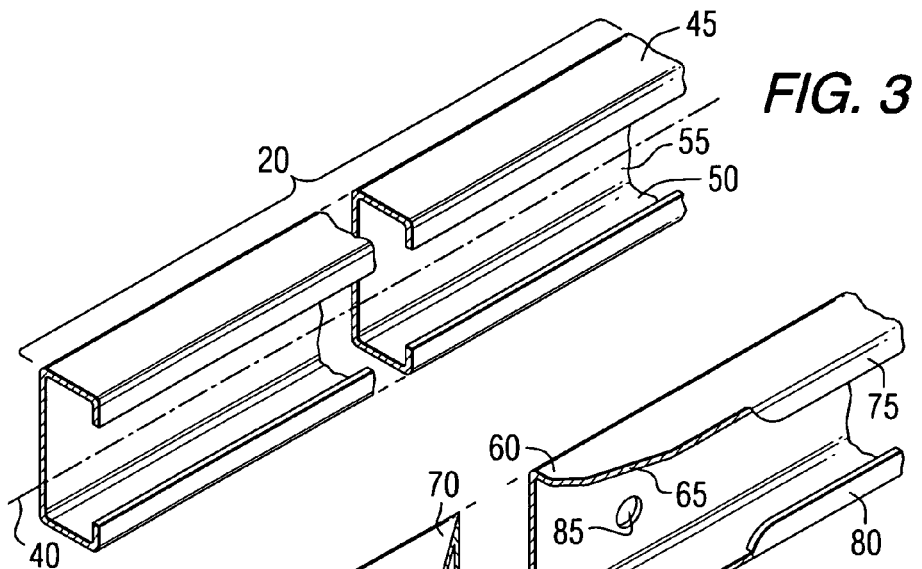
FIG. 3
FIG. 4
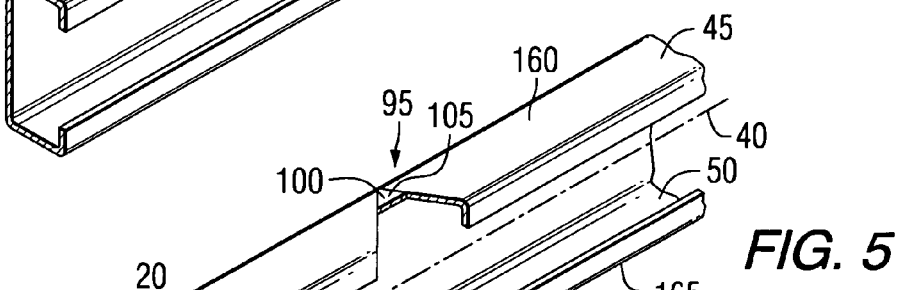
FIG. 5
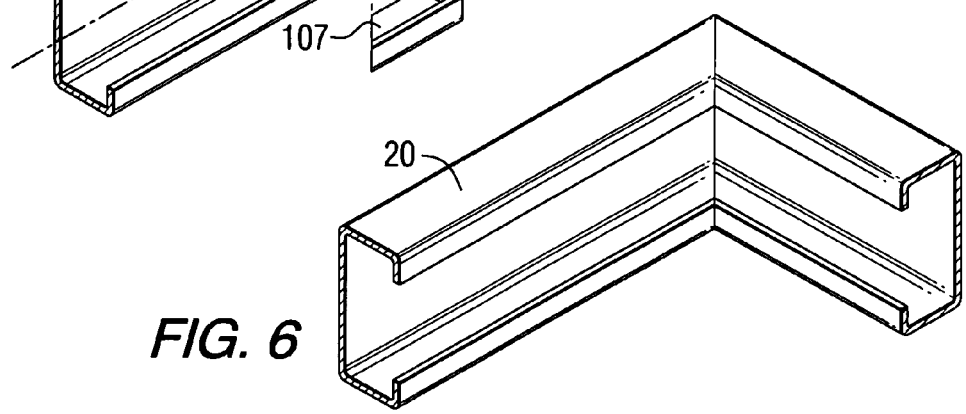
FIG. 6

APPARATUS FOR PREPARING U-SHAPED SPACERS FOR INSULATING UNITS

BACKGROUND OF THE INVENTION

1. Field of the Invention

This invention relates to manufacturing U-shaped spacers that may be utilized between glass sheets on sealed windows.

2. Description of the Related Art

Directing attention to FIGS. 1 and 2, an insulating unit 10 includes an edge assembly 12 used to space apart sheets 14, typically coated and/or uncoated glass sheets. The edge assembly 12 includes moisture and gas impervious adhesive-type sealant layers 16 which adhere to the glass sheets 14 and the sides 18 of the spacer 20, which is typically a U-shaped channel, to provide a compartment 22 between the sheets 14. The sealant layers 16 act as barriers to moisture entering the unit and/or to prevent gas, such as an insulating gas, from exiting the compartment 22. An additional adhesive sealant-type layer or structural adhesive layer 24 can be provided in a perimeter groove of the unit 10 formed by the spacer 20 and marginal edges of the sheets 14. A thin layer or bead 26 of a matrix with moisture and/or gas pervious adhesive having a desiccant 28 therein to absorb moisture in the compartment 22 can be provided on the inner surface of the bottom of the metal spacer 20, as viewed in FIG. 2. As illustrated in FIG. 1, the insulating unit 10 may have a rectangular or square shape and, as a result, each corner region 28 of the metal spacer 20 must be designed to accommodate bending. In general, the corner regions 28 are typically perforated such that the opposing sides 45, 50 in the corner region 28 collapse inwardly as the spacer 20 is folded.

Typically, these spacers 20 are manufactured in mass production using a machine that has been set up and dedicated to fabricating spacers of a particular size (e.g., width, depth, length, etc.). Once the run for a particular sized spacer has been completed, the machine is modified and spacers of a different size are thereafter produced. However, with relative frequency, a particular spacer from a previous run can be damaged or destroyed such that it must be replaced. Retooling a machine for the production of one or a few replacement spacers 20 after the run for that spacer has been completed is neither economical nor efficient. It should be noted, however, that it is relatively simple to produce single length straight spacer pieces that do not have corner configurations and that have not been bent. However, there is neither a device nor a method available for further processing pre-existing spacers to accommodate an insulating unit such as that illustrated in FIG. 1.

Additionally, during the process of forming insulating units, opposing ends of the spacer 20 are mated to one another to form the insulating unit 10. To introduce an insulating gas between the glass sheets 14, an access hole typically extends through the overlapping portion of the opposing sides and into the compartment 22. After introduction of the gas, the access hole can be sealed using, for example, a screw extending therethrough such that the inert gas is retained within the compartment 22.

Once again, during mass production of spacers 20 to be utilized with a particular insulating unit 10, the ends of each spacer 20 can be formed and the axis hole introduced. However, in the event individual pre-existing spacer units must be customized for particular insulating units 10, there is neither a device nor a method currently available to cut such access holes to provide such a configuration.

A need exists for a device and/or a method for processing spacers 20 to accommodate the different shapes of a variety of different insulating units without the need to retool mass production machinery.

SUMMARY OF THE INVENTION

The invention is directed to a device for preparing a U-shaped spacer having a longitudinal axis, wherein the spacer has first and second opposing sides extending from a spacer bottom. The spacer can be used as a spacer between glass sheets on sealed windows. The spacer can be bent and still retain a depth suitable to accept a matrix for sealing the spacer around the window when mounted within an insulating unit, such as a window frame. In one embodiment, the device comprises:

a) a base;
b) a guide within the base for firmly supporting the U-shaped spacer;
c) an embossing subassembly movable in an operating direction perpendicular to the longitudinal axis for imparting to the opposing sides of the spacer a corner configuration having a perforation pattern; and
d) a pressing element for activating the embossing subassembly, wherein the perforation pattern is intended to retain a lower section of the opposing sides for accepting the matrix and to cause the lower section of the sides to collapse inwardly when the spacer is bent.

The subject invention is also directed to a method of preparing a U-shaped spacer for use as spacer stock to fabricate a spacer frame for an insulting unit, such as a sealed window, wherein the spacer has a longitudinal axis and has first and second opposing sides extending from a spacer bottom. The spacer may be bent and still retain a depth suitable to accept a matrix for sealing the spacer around the window when mounted within a window frame. The method is directed to imparting a corner configuration at select locations along the length of the spacer and is comprised of the steps of:

1) shearing a first (upper) section of each opposing side;
2) embossing a perforation pattern upon the outer surface of a second (lower) section of each opposing edge; and
3) embossing a complimentary perforation pattern upon the inner surface of the lower section of each opposing edge, wherein the perforation patterns permit the opposing sides to retain a matrix and to cause the lower section of the spacer when bent to deflect inwardly toward the longitudinal axis.

BRIEF DESCRIPTION OF THE DRAWINGS

FIG. 3 is a perspective view of a spacer prior to being processed to accommodate an insulating unit;

FIG. 4 is a perspective view of a spacer wherein each end has been processed such that one intimately attaches with the other;

FIG. 5 is a spacer in which a corner configuration has been introduced, thereby permitting the spacer to be bent;

FIG. 6 is a perspective view of a spacer having a corner configuration wherein the spacer has been bent to a 90° corner;

DETAILED DESCRIPTION OF THE INVENTION

Figure 1:
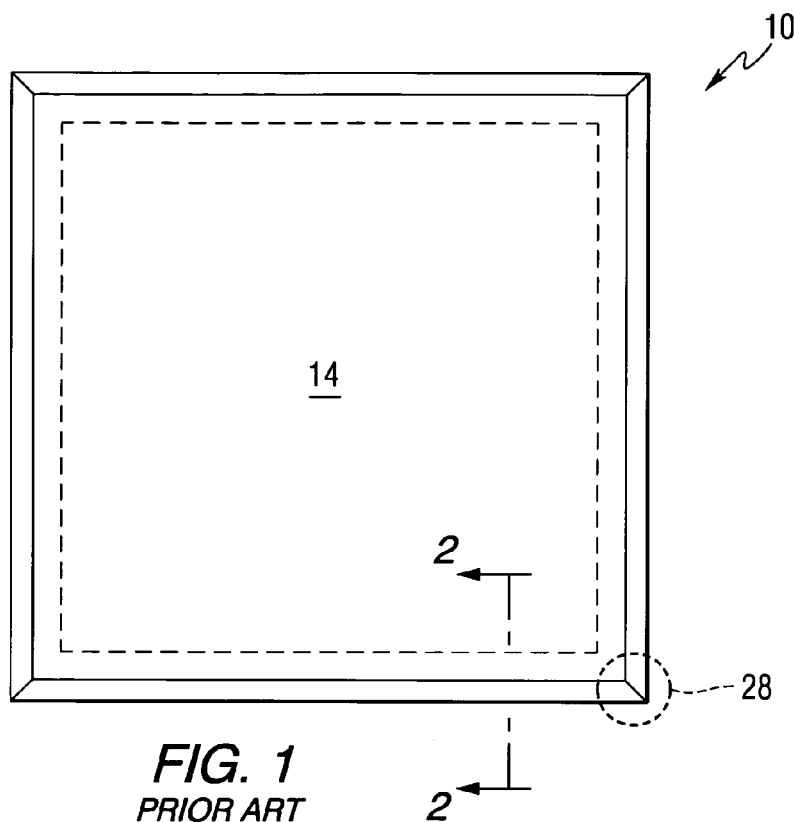
FIG. 1 is a front view of an insulating unit utilizing a spacer.
Figure 2:
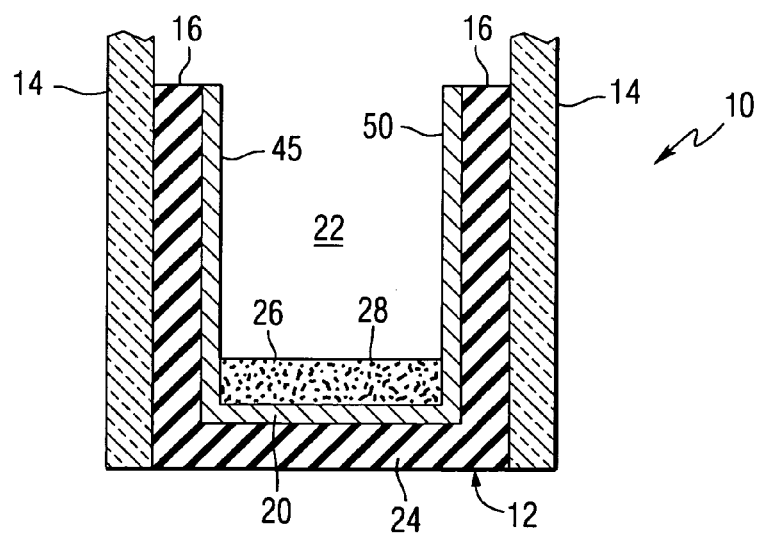
FIG. 2 is a view taken along line 2—2 of FIG. 1.

As used herein, spatial or directional terms, such as "left", "right", "inner", "outer", "above", "below", "upper", "lower", "perpendicular", and the like, relate to the invention as it is shown in the drawing figures. However, it is to be understood that the invention may assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims are approximations that may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to include the beginning and ending range values and to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10. Any document referred to herein should be considered to be "incorporated by reference" in its entirety.

FIG. 3 illustrates a spacer 20, such as a metal spacer, in the form of a U-shaped channel having a longitudinal axis 40. The spacer 20 has a first opposing side 45 and a second opposing side 50 extending from a spacer bottom 55. As previously discussed, the spacer 20 can be utilized to space apart glass sheets on insulating units, such as sealed windows.

The general concepts of the invention will now be described with respect to the exemplary embodiment shown in the drawing figures. However, it is to be understood that the invention is not limited to this specific exemplary embodiment.

Directing attention to FIG. 4, in general, the spacer 20 can be prefabricated having a first end 60 with a tapered configuration 65 suitable to fit within the profile of a second end 70 when the spacer 20 is bent such that the opposing ends 60, 70 of the spacer 20 are adjacent. To minimize exposure to sharp ends and to provide an arrangement that will capture the first end 60 within the second end 70, each opposing side 45, 50 can have associated with it a pair of inwardly directed projections or wings 75, 80, respectively. As evidenced in FIG. 4, the wings 75, 80 do not extend within the tapered configuration 65. The two portions illustrated in FIG. 4 are actually two ends of the same continuous piece which, as will be discussed below, can be bent such that the first end 60 is aligned with and inserted within the second end 70 of the spacer 20. Access holes 85, 90 can be prefabricated or formed in the spacer 20, such that when the spacer 20 is assembled, the access hole 85 aligns with the access hole 90 to form an access passage positioned on the spacer 20 a fixed distance from the second end 70. The location of the second end 70 is a function of the insulating unit for which the spacer 20 is intended. Furthermore, the second end 70 can be angled, as illustrated in FIG. 4. Such an angle can be imparted to the spacer 20 as a function of the spacer desired for a particular insulating unit.

Directing attention to FIGS. 5 and 6, in order to bend the spacer 20 to accommodate the shape of different insulating units, the spacer 20 has a corner configuration 95 with a perforation pattern 100. The perforation pattern 100 is intended to retain a first or lower section 105 (as shown in FIG. 5) of the opposing sides 45, 50 for accepting a matrix and to cause the lower sections 105 of the sides 45, 50 to collapse inwardly when the spacer 20 is bent. Such a bent configuration is illustrated in FIG. 6.

Figure 7:
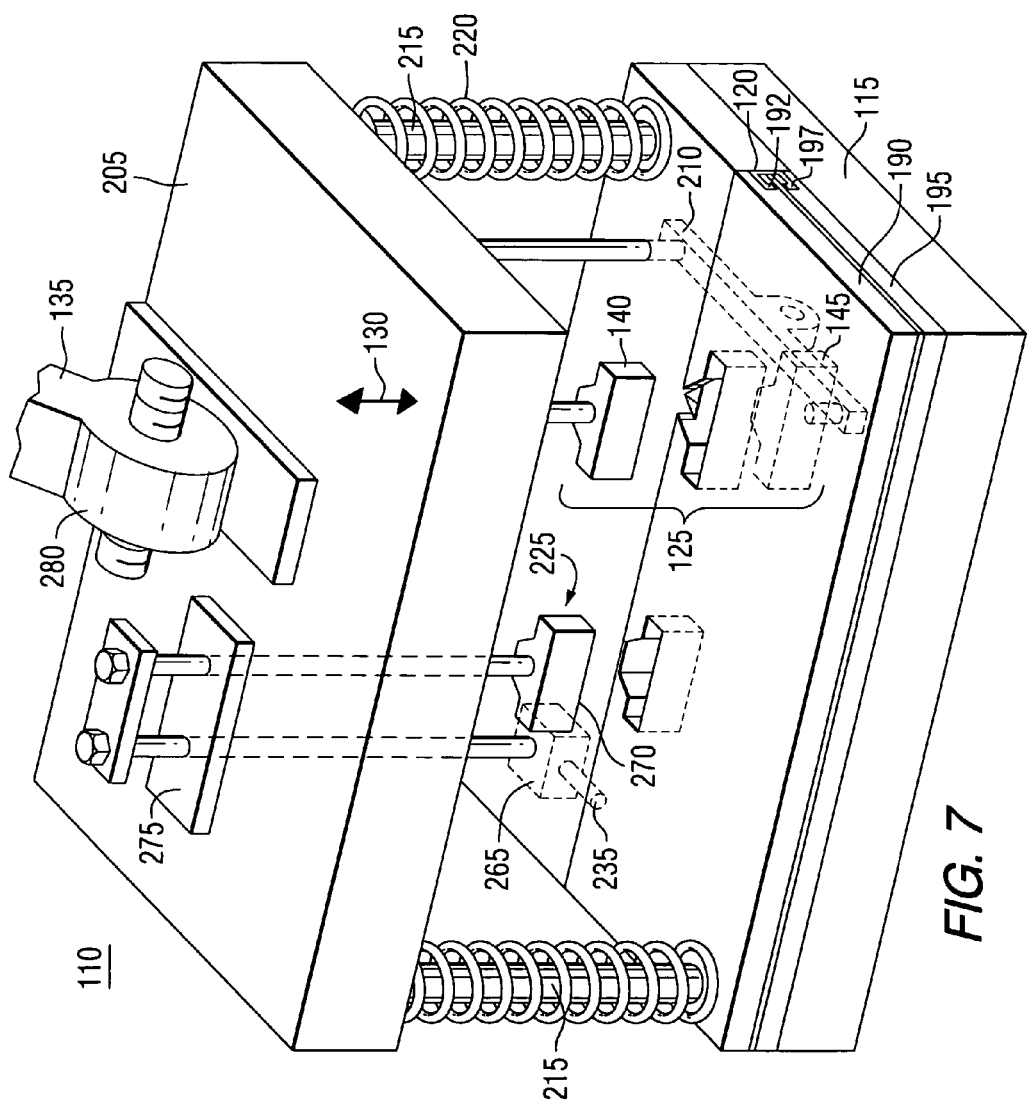
FIG. 7 is a perspective view of a device for preparing spacers to include corner configurations and end configurations.
Figure 8:
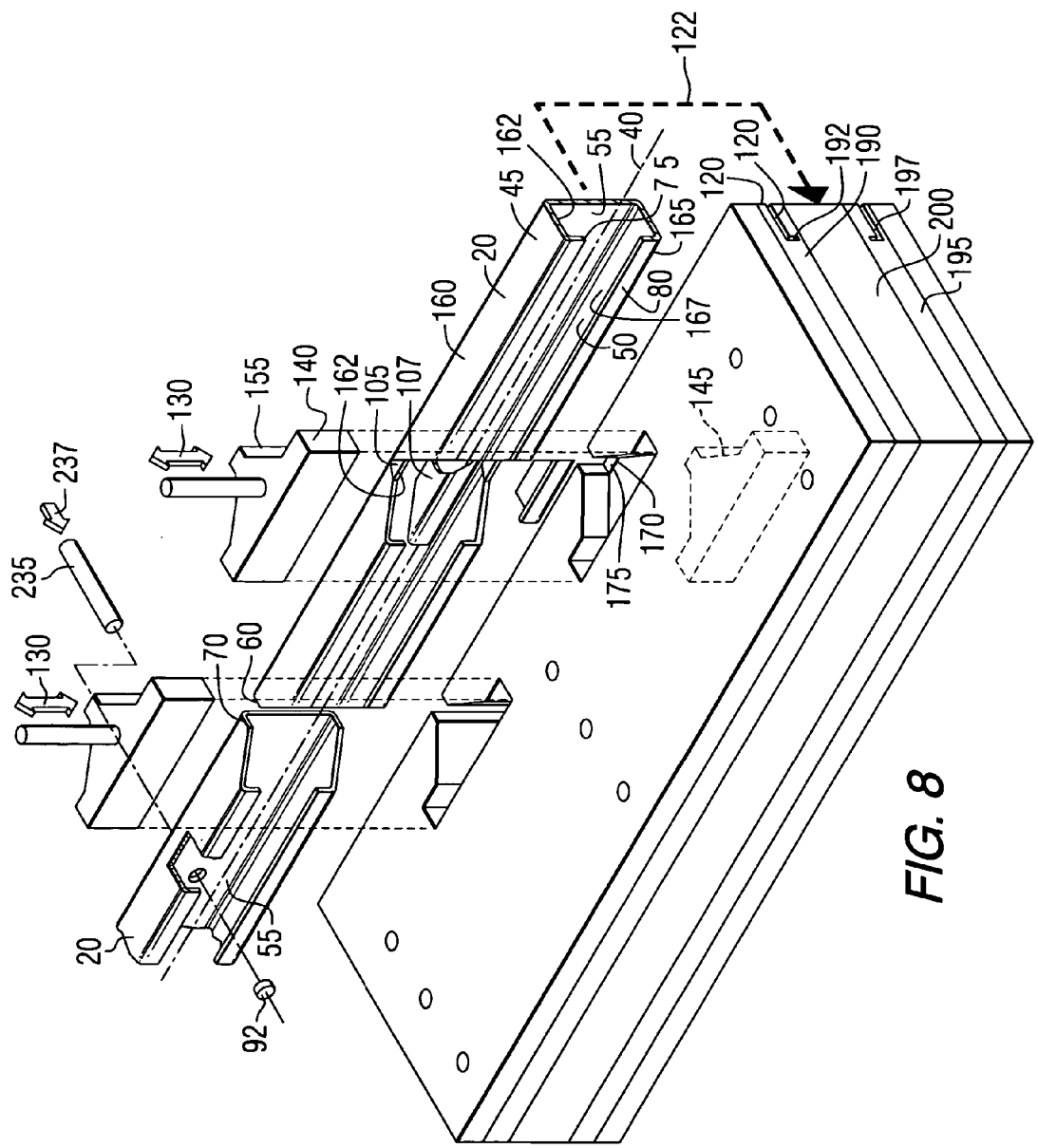
FIG. 8 is an exploded view of select portions illustrated in FIG. 7.
Figure 11:
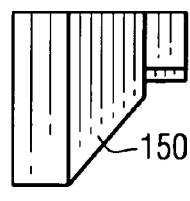
FIG. 11 is a side view of the embossing element illustrated in FIG. 9.
Figure 10:
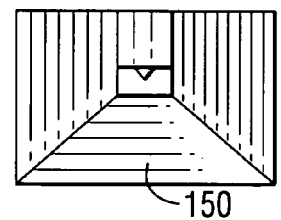
FIG. 10 is a front view of the embossing element illustrated in FIG. 9.
Figure 12:
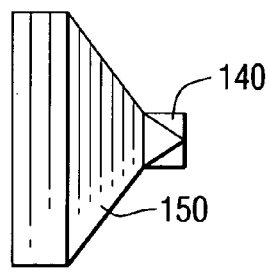
FIG. 12 is a bottom view of the embossing element illustrated in FIG. 9.

Directing attention to FIGS. 7 and 8, a device 110 is illustrated for preparing a spacer 20 preformed to a U-shaped channel having a longitudinal axis 40. As previously mentioned, the spacer 20 has first and second opposing sides 45, 50 extending from the spacer bottom 55.

The device 110 includes a base 115 and a guide 120 within the base 115 for firmly supporting the spacer 20. The guide 120 can be, for example, a channel or passage extending through the base 115 and corresponding generally to the cross-sectional shape of the spacer 20.

An embossing subassembly 125 is movable in an operating direction 130 towards and away from the base 115. For example, the subassembly can be movable vertically and/or perpendicularly with respect to the longitudinal axis 40 for imparting to the opposing sides 45, 50 of the spacer 20, the corner configuration 95 having the perforation pattern 100 previously discussed.

A pressing element 135 can be used to activate, i.e. move, the embossing subassembly 125.

The perforation pattern 100 (FIG. 5) is intended to retain a lower section 105 of the opposing sides 45, 50 for accepting a matrix and to cause the lower section 105 of the sides 45, 50 to collapse inwardly when the spacer 20 is bent.

Returning attention to FIG. 7, the embossing subassembly 125 includes a first forming member 140 and a second forming member 145 movable relative to the base 115, e.g., in opposing vertical directions 130 perpendicular to the longitudinal axis 40 and aligned with the base 115 to act upon a spacer 20 that may be secured within the guide 120.

Directing attention to FIGS. 9–12, each forming member, for example, forming member 140, can be comprised of a shearing element 150 which can be aligned to engage and remove by shearing an upper section 107 (FIG. 5) of each opposing side 45, 50. For illustration, upper section 107 in FIG. 5 is shown removed from opposing side 50. In actuality, a similar upper section is also removed from opposing side 45 by the second forming member 145. Furthermore, upper section 107, when it is removed, is displaced inwardly toward the longitudinal axis 40, not outwardly as shown in FIG. 5.

The first forming member 140 furthermore can include a primary embossing element 155, which can be aligned to emboss, as shown in FIG. 5, a perforation pattern 105 upon the outer surface 160 of the lower section 105 of opposing side 45.

The second forming member 145 (FIGS. 7 and 8) can act upon opposing side 50 in the same fashion to emboss a perforation pattern 105 upon the outer surface 165 of the lower section 105 of opposing side 50.

The first forming member 140 and the second forming member 145 act upon the first opposing side 45 and the second opposing side 50, respectively.

FIG. 8 illustrates the motion by which the first forming member 140 moves downwardly against the opposing side 45 of spacer 20. For illustrative purposes, the spacer 20 is shown outside of the guide 120, but it should be understood that the spacer 20 is secured within the guide 120 for any processing by the forming members 140, 145. The spacer 20 can be moved within the guide 120 as suggested by arrow 122. With the spacer 20 positioned within the guide 120, the first forming member 140 moves downwardly such that the shearing element 150 (not seen in FIG. 8) shears the material from the upper section 107 and perforates the material in the lower section 105 by urging the primary embossing element 155 against the lower section 105 of the spacer 20. To complement the primary embossing element 155, a backing segment 170 is aligned with first forming member 140, wherein the backing segment 170 supports the spacer 20 in the region of the primary embossing element 155. The backing segment 170 includes a secondary embossing element 175 complementary to that provided by the primary embossing element 155 such that, while the primary embossing element 155 acts upon the outer surface 160 of opposing sides 45, the secondary embossing pattern 175 of the backing segment 170 acts upon the inner surface 162 of the lower section 105 of the first opposing side 45.

Figure 9:
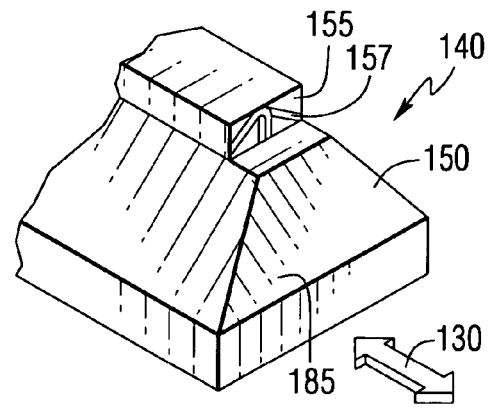
FIG. 9 is a perspective view of a primary embossing element used to impart a corner configuration.

The primary embossing element 155, as seen in FIG. 9, has a protruding embossing pattern 157 and the backing segment 170 (FIG. 8) has a recessed embossing pattern complementary to the primary embossing pattern 155 to impart the perforation pattern 102 to the inner surface 162 and to the outer surface 160 of opposing side 45 to ensure that, when bent, the embossed segment will collapse inwardly toward the longitudinal axis 40 of the spacer 20.

It should be appreciated that while the details just provided were used with respect to the first forming member 140, the second forming member 145 can be identical, including a backing segment (not shown). The orientation and motion of the second forming member 145, as illustrated in FIG. 7, is opposite to that of the first forming member 140. Therefore, it should be understood that the imparting of perforations just described with respect to the outer surface 160 and the inner surface 162 of opposing side 45 will be duplicated by the second forming element 145 acting upon opposing side 50 to form such perforations on the outer surface 165 and the inner surface 167 of opposing side 50.

Directing attention to FIG. 9, the shearing element 150 is also comprised of a plane 185 inclined relative to the operating direction 130 to promote a shearing action against opposing sides 45, 50 of the spacer 20 to remove the upper section 107 (FIG. 5) of the spacer 20.

The device 110, in accordance with the subject application, is capable of accommodating spacers 20 with bottoms 55 of various widths. In particular, directing attention to FIG. 8, the base 115 is comprised of two opposing working plates 190, 195, having slots 192, 197 therein to accept the opposing sides 45, 50 and the wings 75, 80 of the spacer 20.

The base 115 is further comprised of at least one interchangeable spacing plate 200 therebetween that can space the opposing working plates 190, 195 to accommodate spacers 20 having bottoms 55 of different widths.

Directing attention to FIG. 7, the pressing element 135 is comprised of a pressing plate 205 movable in a vertical direction 130 perpendicular to the longitudinal axis 40. The first forming member 140 is connected to and moves with the plate 205. A lever 210, illustrated in phantom in FIG. 7, transfers the downward motion of the plate 205 to an upward motion of the second forming member 145 such that movement of the first forming member 140 in one direction causes movement of the second forming member 145 in the opposite direction. The pressing plate 205 is slidingly secured to the base 115 through posts 215 and is biased away from the base 115 by springs 220 which may be coil springs.

The device 110 is further comprised of a shear/punch subassembly 225 for imparting an end configuration similar to that seen in FIG. 4 at the second end 70 of the spacer 20, along the length of the spacer 20 by completely shearing the spacer 20 to form the end 70. The shear/punch subassembly 225 additionally imparts an access hole 90 within the bottom 55 of the spacer 20 adjacent to the newly formed end 70 by removing slug 92 from the bottom 55 of the spacer 20.

Figure 13:
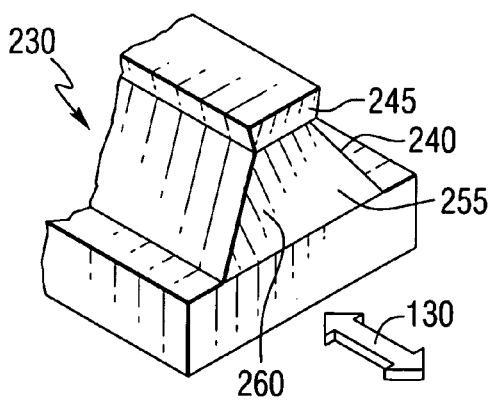
FIG. 13 is a perspective view of the shearing element used to shear the end of a spacer.
Figure 14:
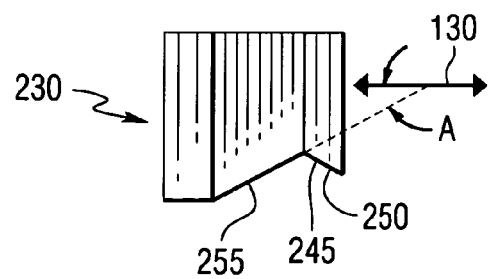
FIG. 14 is a side view of the shearing element illustrated in FIG. 13.

Directing attention to FIGS. 13 and 14, the shear/punch subassembly 225 is comprised of a shearing member 230 movable in a vertical direction 130 (FIG. 8) perpendicular to the longitudinal axis 40 of the spacer 20 and aligned with the base 115 to act upon the spacer 20 secured within the guide 120 to completely shear the spacer 20. This motion is illustrated in FIG. 8.

The punch subassembly 225 (FIG. 8) is further comprised of a punch 235 movable in a horizontal direction 237 perpendicular to the longitudinal axis 40 to penetrate and impart to the bottom 55 of the spacer 20 the access hole 90. Unlike the embossing subassembly, the shear/punch subassembly 225 has only a single shearing member 230 that acts in a single direction across the entire width of the spacer 20 to shear through the spacer 20.

Turning attention to FIGS. 13 and 14, the shearing member 230 has an angled cross-section 240 when viewing in the direction of arrow 130, to impart a beveled cut to the spacer 20. The bevel is clearly illustrated in FIG. 4 at second end 70. Returning to FIGS. 13 and 14, the shearing member 230 also has an anti-smear element 245, which provides a positive rake cutting edge 250 and which is, furthermore, comprised of a working element 255 adjacent thereto and having a plane 260 inclined at an angle A of between 0°–60° relative to the operating direction 130, as seen in FIG. 14.

The device 110 further includes a wedge 265 (shown in phantom in FIG. 7) mounted to the pressing plate 205 which acts downwardly upon a mating wedge 270 attached to the punch 235 to convert the vertical downward motion of the plate 205 into a horizontal motion for the punch 235 necessary to impart the access hole 90 within the spacer 20.

Directing attention to FIG. 7, the shear/punch subassembly 225 can be removably mounted to the pressing plate 205 such that, when desired, mounting plate 275, which is secured to the pressing plate 205, can be removed, thereby removing the entire shear/punch subassembly 235 from the device 110.

The pressing element 135, as illustrated in FIG. 7, can be comprised of a lever operated cam 280.

The subject invention is also directed to a method of preparing a U-shaped spacer for use as spacer stock to fabricate an insulating unit 10 (FIG. 1), such as a sealed window. The method is comprised of imparting a corner configuration 95 (FIG. 5) at select locations along the length of the spacer 20 by shearing an upper section 107 of each opposing side 45, 50 and, furthermore, by embossing a perforation pattern 100 on the outer surface 160, 165 of a lower section 105 of each opposing side 45, 50. Additionally at this time, a complementary perforation pattern 102 is embossed upon the inner surfaces 162, 167 of the lower section 105 of each opposing side 45, 50. In this fashion, the perforation patterns 100, 102 permit the opposing sides 45, 50 to retain a matrix and to cause the lower section 105 of the spacer 20 when bent to deflect inwardly toward the longitudinal axis 40.

This process of embossing a perforation pattern 100 is comprised of embossing indentations on the outer surface 160, 165 of each opposing side 45, 50 and embossing a complementary perforation pattern 102 by embossing projections on the inner surface 162, 167 of each opposing side 45, 50.

The end configuration may be imparted at a select location along the length of the spacer 20 by completely shearing the spacer 20 to define a spacer end 70 and imparting an access hole 90 within the bottom 55 of the spacer 20 at a predetermined location from the spacer end 70.

While FIG. 1 illustrates a rectangular insulating unit 10, it should be appreciated that, by using multiple corner configurations 95 (FIG. 5), it is possible to bend the spacer 20 to conform to a variety of different shapes, including a round or oval shape conforming to round or oval-shaped windows.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A device for preparing a U-shaped spacer having a longitudinal axis, wherein the spacer has first and second opposing sides extending from a spacer bottom and wherein the spacer is to be used as a spacer between glass sheets on sealed windows, and wherein the spacer may be bent and still retain a depth suitable to accept a matrix for sealing the spacer around the window when mounted within an insulating unit, comprising:
   a) a base;
   b) a guide within the base for firmly supporting the U-shaped spacer;
   c) an embossing subassembly movable in an operating direction vertical and perpendicular to the longitudinal axis for imparting to the opposing sides of the spacer a corner configuration having a perforation pattern; and
   d) a pressing element for activating the embossing subassembly, wherein the perforation pattern is intended to retain a lower section of the opposing sides for accepting the matrix and to cause the lower section of the sides to collapse inwardly when the spacer is bent, wherein the embossing subassembly is comprised of:
      i) a first forming member and a second forming member movable in opposing vertical directions perpendicular to the longitudinal axis and aligned within the base to act upon a spacer that may be secured within the guide, wherein each forming member is comprised of:
         1) a shearing element which is aligned to engage and remove by shearing an upper section of each opposing side; and
         2) a primary embossing element which is aligned to emboss a perforation pattern upon the outer surface of the lower section of an opposing side, wherein the first forming member and the second forming member act upon the first opposing side and the second opposing side, respectively.

2. The device according to claim 1, further including a backing segment aligned with each forming member, wherein the backing segment supports the spacer in the region of the primary embossing element and includes a secondary embossing element complementary to that provided by the primary embossing element upon the inner surface of the lower section of each of the first and second opposing sides.

3. The device according to claim 1, wherein each primary embossing element has a protruding embossing pattern and each backing segment has a complementary embossing pattern to impart a perforation pattern to the inner and outer surfaces of each opposing side to ensure, when bent, the embossed segment will collapse inwardly toward the longitudinal axis of the spacer.

4. The device according to claim 1, wherein the shearing element of the forming member is comprised of a plane inclined relative to the operating direction to promote a shearing action against both opposing sides of the spacer.

5. A device for preparing a U-shaped spacer having a longitudinal axis, wherein the spacer has first and second opposing sides extending from a spacer bottom and wherein the spacer is to be used as a spacer between glass sheets on sealed windows, and wherein the spacer may be bent and still retain a depth suitable to accept a matrix for sealing the spacer around the window when mounted within an insulating unit, comprising:
   a) a base;
   b) a guide within the base for firmly supporting the U-shaped spacer;
   c) an embossing subassembly movable in an operating direction vertical and perpendicular to the longitudinal axis for imparting to the opposing sides of the spacer a corner configuration having a perforation pattern; and
   d) a pressing element for activating the embossing subassembly, wherein the perforation pattern is intended to retain a lower section of the opposing sides for accepting the matrix and to cause the lower section of the sides to collapse inwardly when the spacer is bent, wherein the base is comprised of two opposing working plates having slots therein to accept the opposing sides of the spacer and further comprised of at least one interchangeable spacing plate therebetween that may space the opposing working plates to accommodate spacers having bottoms with different widths.

6. A device for preparing a U-shaped spacer having a longitudinal axis, wherein the spacer has first and second opposing sides extending from a spacer bottom and wherein the spacer is to be used as a spacer between glass sheets on sealed windows, and wherein the spacer may be bent and still retain a depth suitable to accept a matrix for sealing the spacer around the window when mounted within an insulating unit, comprising:
   a) a base;
   b) a guide within the base for firmly supporting the U-shaped spacer;

c) an embossing subassembly movable in an operating direction vertical and perpendicular to the longitudinal axis for imparting to the opposing sides of the spacer a corner configuration having a perforation pattern; and d) a pressing element for activating the embossing subassembly, wherein the perforation pattern is intended to retain a lower section of the opposing sides for accepting the matrix and to cause the lower section of the sides to collapse inwardly when the spacer is bent, wherein the embossing assembly comprises a first forming member and a second forming member, wherein the pressing element is comprised of a pressing plate movable in a vertical direction perpendicular to the longitudinal axis, wherein the first forming member is connected to and moves with the plate, and the pressing element is further comprised of a lever transferring the downward motion of the plate to an upward motion of the second forming member such that movement of the first forming member in one direction causes movement of the second forming member in the opposite direction.

7. The device according to claim 6, wherein the pressing plate is slidingly secured to the base and biased away from the base.

8. A device for preparing a U-shaped spacer having a longitudinal axis, wherein the spacer has first and second opposing sides extending from a spacer bottom and wherein the spacer is to be used as a spacer between glass sheets on sealed windows, and wherein the spacer may be bent and still retain a depth suitable to accept a matrix for sealing the spacer around the window when mounted within an insulating unit, comprising:

a) a base;

b) a guide within the base for firmly supporting the U-shaped spacer;

c) an embossing subassembly movable in an operating direction vertical and perpendicular to the longitudinal axis for imparting to the opposing sides of the spacer a corner configuration having a perforation pattern;

d) a pressing element for activating the embossing subassembly, wherein the perforation pattern is intended to retain a lower section of the opposing sides for accepting the matrix and to cause the lower section of the sides to collapse inwardly when the spacer is bent; and (e) a shear/punch subassembly for imparting an end configuration along the length of the spacer by completely shearing the spacer to form an end and simultaneously imparting an access hole within the bottom of the spacer adjacent to the newly formed end, wherein the shear/punch subassembly is also activated by the pressing element, wherein the shear/punch subassembly is comprised of:

a) a shearing member movable in a vertical direction perpendicular to the longitudinal axis and aligned with the base to act upon the spacer secured within the guide to completely shear the spacer; and b) a punch movable in a horizontal direction perpendicular to the longitudinal axis to penetrate and impart to the bottom of the spacer an access hole.

9. The device according to claim 8, wherein the shearing member has an angled cross section to impart a beveled cut to the spacer.

10. The device according to claim 9, wherein the shearing member is comprised of an anti-smear element which provides a positive rake cutting edge and which is furthermore comprised of a working element adjacent thereto having a plane inclined relative to the operating direction.

11. A device for preparing a U-shaped spacer having a longitudinal axis, wherein the spacer has first and second opposing sides extending from a spacer bottom and wherein the spacer is to be used as a spacer between glass sheets on sealed windows, and wherein the spacer may be bent and still retain a depth suitable to accept a matrix for sealing the spacer around the window when mounted within an insulating unit, comprising:

a) a base;

b) a guide within the base for firmly supporting the U-shaped spacer;

c) an embossing subassembly movable in an operating direction vertical and perpendicular to the longitudinal axis for imparting to the opposing sides of the spacer a corner configuration having a perforation pattern;

d) a pressing element for activating the embossing subassembly, wherein the perforation pattern is intended to retain a lower section of the opposing sides for accepting the matrix and to cause the lower section of the sides to collapse inwardly when the spacer is bent;

(e) a shear/punch subassembly for imparting an end configuration along the length of the spacer by completely shearing the spacer to form an end and simultaneously imparting an access hole within the bottom of the spacer adjacent to the newly formed end, wherein the shear/punch subassembly is also activated by the pressing element, wherein the pressing element comprises a pressing plate movable perpendicular to the longitudinal axis, wherein the shear/punch subassembly comprises a punch movable perpendicular to the longitudinal axis; and (f) a wedge mounted to the pressing plate which acts downwardly upon a mating wedge attached to the punch to convert the vertical downward motion of the plate to a horizontal motion for the punch.

* * * * *